(12) United States Patent
Homma et al.

(10) Patent No.: US 10,606,441 B2
(45) Date of Patent: *Mar. 31, 2020

(54) OPERATION CONTROL DEVICE AND OPERATION CONTROL METHOD

(71) Applicant: Sony Corporation, Tokyo (JP)

(72) Inventors: Fuminori Homma, Tokyo (JP);
Tatsushi Nashida, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/025,435

(22) Filed: Jul. 2, 2018

(65) Prior Publication Data

US 2018/0307396 A1 Oct. 25, 2018

Related U.S. Application Data

(63) Continuation of application No. 14/159,594, filed on Jan. 21, 2014, now Pat. No. 10,042,508, which is a (Continued)

(30) Foreign Application Priority Data

Jul. 22, 2009 (JP) ................. P2009-171053

(51) Int. Cl.
*G06F 3/0481* (2013.01)
*G06F 3/01* (2006.01)

(52) U.S. Cl.
CPC .......... *G06F 3/04812* (2013.01); *G06F 3/017* (2013.01)

(58) Field of Classification Search
CPC ................. G06F 3/04812–3/0489; G06F 3/017
See application file for complete search history.

(56) References Cited

U.S. PATENT DOCUMENTS

| 6,204,828 B1* | 3/2001 | Amir ...................... G06F 3/013 |
| | | 345/156 |
| 6,437,794 B1* | 8/2002 | Ohshima ................. G06F 3/011 |
| | | 345/619 |

(Continued)

FOREIGN PATENT DOCUMENTS

| EP | 0 571 702 A2 | 12/1993 |
| JP | 05-324181 A | 12/1993 |
| JP | 08-308801 A | 11/1996 |

*Primary Examiner* — Roland J Casillas
(74) *Attorney, Agent, or Firm* — Lerner, David, Littenberg, Krumholz & Mentlik, LLP

(57) ABSTRACT

There is provided an operation control device including a motion detection part which detects an object to be detected, which is moved by motion of a user, a motion determination part which determines motion of the object to be detected based on a detection result, a movable region movement processing part which moves a cursor movable region including a cursor operating an object displayed in a display region, and a cursor movement processing part which moves the cursor. Based on motion of a first detected object, the movable region movement processing part moves the cursor movable region along with the cursor in the display region by a first movement unit. Based on motion of a second detected object, the cursor movement processing part moves only the cursor in the cursor movable region by a second movement unit smaller than the first movement unit.

12 Claims, 10 Drawing Sheets

Related U.S. Application Data continuation of application No. 12/803,829, filed on Jul. 7, 2010, now Pat. No. 8,659,549.

(56) References Cited

U.S. PATENT DOCUMENTS

| | | |
|---|---|---|
| 2006/0209021 A1* | 9/2006 | Yoo .......................... G06F 3/017 345/156 |
| 2008/0036743 A1 | 2/2008 | Westerman et al. |
| 2009/0046110 A1 | 2/2009 | Sadler et al. |
| 2009/0058829 A1 | 3/2009 | Kim et al. |
| 2009/0150775 A1 | 6/2009 | Miyazaki et al. |

* cited by examiner

FIG. 5
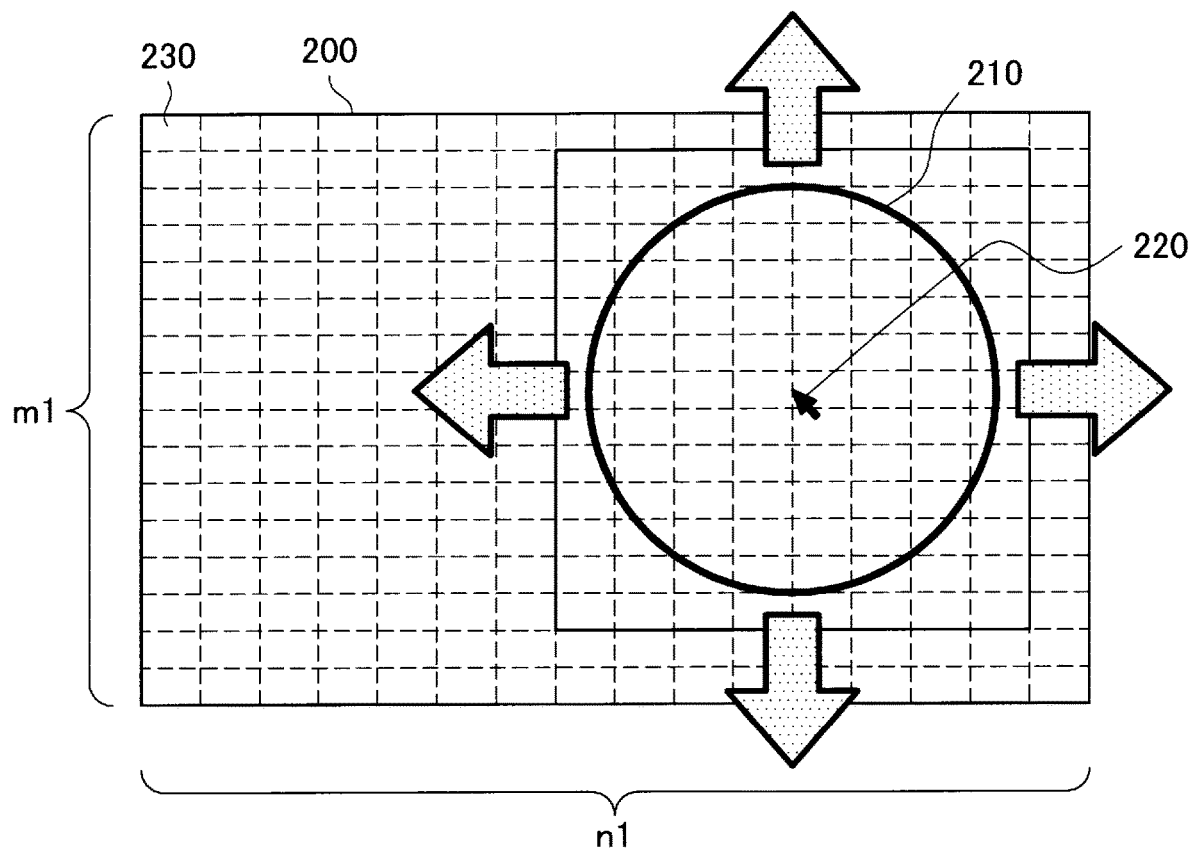
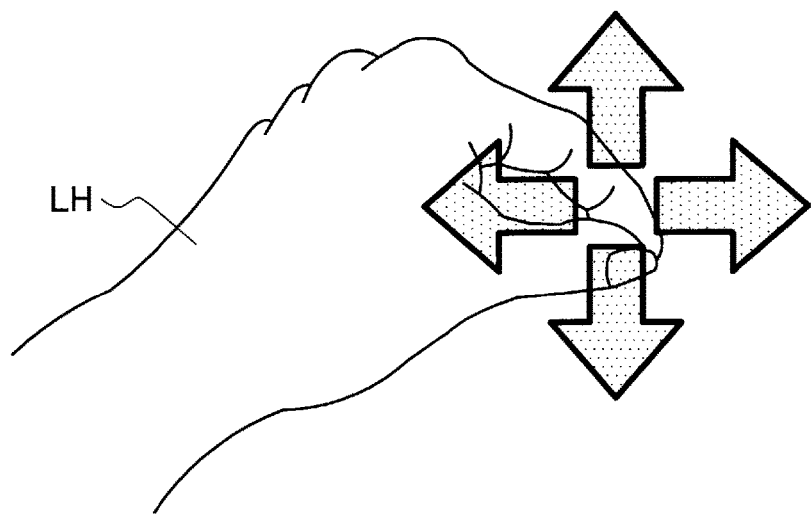

FIG. 6
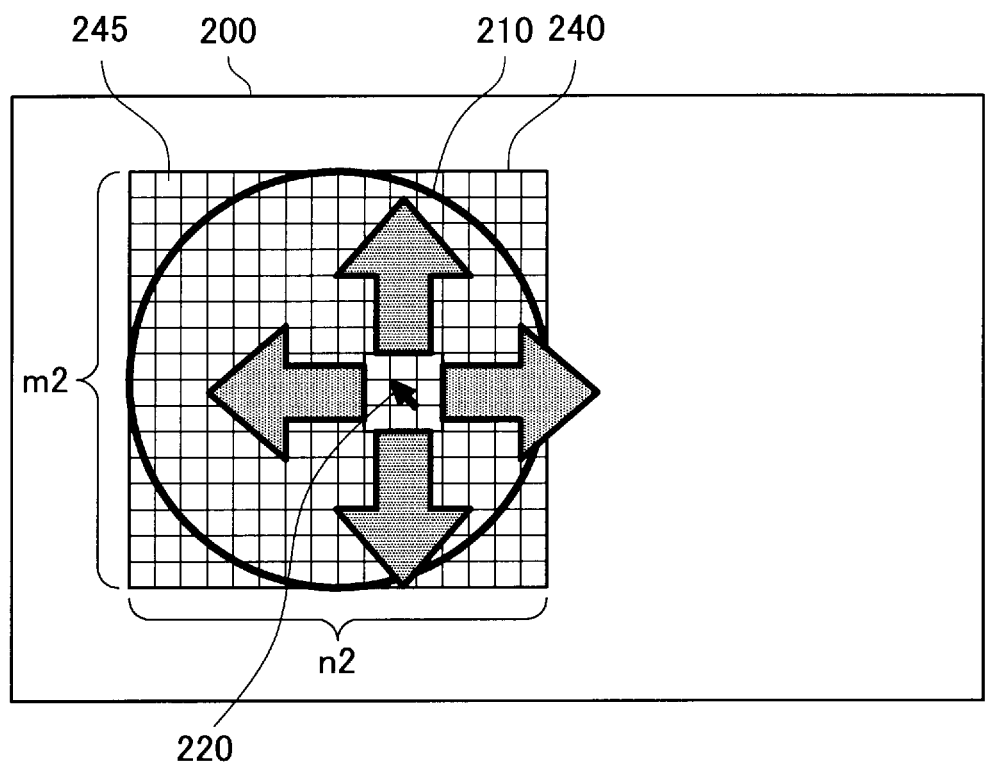
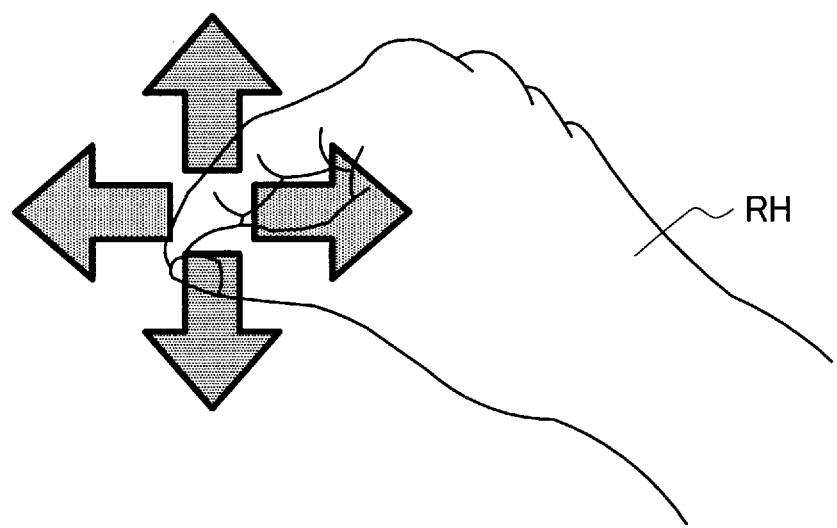

OPERATION CONTROL DEVICE AND OPERATION CONTROL METHOD

CROSS-REFERENCE TO RELATED APPLICATION

The present application is a continuation of U.S. patent application Ser. No. 14/159,594, filed Jan. 21, 2014, which is a continuation of U.S. patent application Ser. No. 12/803, 829, filed on Jul. 7, 2010, (U.S. Pat. No. 8,659,549), which claims priority from Japanese Patent Application No. JP 2009-171053 filed in the Japanese Patent Office on Jul. 22, 2009, all of which are incorporated herein by reference.

BACKGROUND OF THE INVENTION

Field of the Invention

The present invention relates to an operation control device and an operation control method.

Description of the Related Art

In the related art, when equipment is remotely operated, there has been used a remote controller using infrared rays or a radio frequency (RF) signal or a pointing device such as a mouse, a joystick, and a trackball. For example, in the operation of a television, a remote controller is generally used, and, for example, the channel, the sound volume, the hue, the density, and the contrast of the television can be operated. In light of many objects to be controlled, the future diversification of the broadcast service, and a conversion of a television to PC, the operation of the television is expected to be more complicated. Consequently, it is considered that convenience for users is reduced, such as the number of operation keys of a remote controller is increased, the functions are complicated, and the remote controller is increased in size.

In order to solve the above issue, an input device as operation means of equipment has been recently disclosed (for example, Japanese Patent Application Laid-Open No. 5-324181). A user remotely operates the input device by his fingers to directly input information to the input device without using a device such as a remote controller. For example, as shown in FIG. 10, when an input device 10 is used, a user P moves a finger F in front of a display screen 28 of a television receiver 26, whereby information can be input to the input device 10. The input device 10 detects the position of the finger F by means of a spatial position detector 22 such as a stereo camera. A control part 24 then displays a cursor on a two-dimensional coordinate of the display screen corresponding to the position detected by the spatial position detector 22. Moreover, the control part 24 moves the cursor in response to the movement of the finger F. When the user P moves the finger F to thereby move the cursor, and, thus, to select an execution button displayed on the display screen 28, the operation related to the execution button is performed by the control part 24.

SUMMARY OF THE INVENTION

However, in the related art, since the result output from the spatial position detector detecting the finger position is used as it is as the cursor position on the display screen, the motion of the cursor on the display screen may not correspond to the motion of the user's finger. For example, due to motion of fingers that is not intended by a user, such as a hand tremor, the action of a background, and a false detection by the spatial position detector in a space with low detection accuracy, the motion of the cursor on the display screen may not correspond to the motion of the user's finger. In that case, the cursor on the display screen deviates from an orbit intended by the user, and thus it is difficult for the user to accurately point the target execution button.

In gesture recognition, a cursor trace as a basis for the recognition is constituted of continuous coordinate data groups. Thus, such an issue that the motion of the cursor does not correspond to the motion of user's fingers is more serious in gesture functions.

The issue is more noticeable as a fineness of the resolution of a television is higher. Thus, while such a fineness that a cursor is operated by a mouse is maintained, an interface including intuitiveness by a spatial gesture is required.

In light of the foregoing, it is desirable to provide a novel and improved operation control device and operation control method, which can realize the intuitive and highly accurate operation of an operational object.

According to an embodiment of the present invention, there is provided an operation control device including a motion detection part which detects an object to be detected, which is moved by motion of a user, a motion determination part which determines motion of the object to be detected based on a detection result obtained by the motion detection part, a movable region movement processing part which moves a cursor movable region including a cursor operating an object displayed in a display region, and a cursor movement processing part which moves the cursor. The operation control device based on the motion of a first detected object detected by the motion detection part, the movable region movement processing part moves the cursor movable region along with the cursor in the display region by a first movement unit, based on the motion of a second detected object detected by the motion detection part, the cursor movement processing part moves only the cursor in the cursor movable region by a second movement unit smaller than the first movement unit.

According to the present invention, based on the motion of the first detected object, the cursor movable region and the cursor are moved by the first movement unit, and based on the motion of the second detected object, the cursor can be moved by the second movement unit smaller than the first movement unit. The stepwise movement of the cursor can realize the intuitively rough movement of the cursor and the fine movement of the cursor.

Here, when a region formed by dividing the display region into a predetermined number of regions is a first unit region, the cursor movable region includes one or two or more of the first unit regions, and the movable region movement processing part may move the cursor movable region along with the cursor in the unit of the first unit region in accordance with an amount of movement of the first detected object.

Moreover, when a region formed by dividing the cursor movable region into a predetermined number of regions is a second unit region, the cursor movement processing part may move the cursor in the unit of the second unit region in accordance with an amount of movement of the second detected object.

Furthermore, when the cursor is located outside the cursor movable region when the cursor is moved by the second detected object, the movable region movement processing part may move the cursor movable region along with the cursor moved by the second detected object.

Moreover, only when the first detected object is in a movement mode that enables movement of the cursor movable region, the movable region movement processing part may move the cursor movable region, and only when the second detected object is in a movement mode that enables movement of the cursor, the cursor movement processing part may move the cursor.

Furthermore, the size of the cursor movable region moved by the operation control device may be varied.

According to another embodiment of the present invention, there is provided an operation control method, including the steps of detecting an object to be detected, which is moved by motion of a user, determining motion of the object to be detected based on a detection result, moving a cursor movable region, in which a cursor operating an object displayed in a display region is displayed, and the cursor together in the entire display region by a first movement unit based on motion of a first detected object, and moving the cursor in the cursor movable region by a second movement unit smaller than the first movement unit based on motion of a second detected object.

As described above, the present invention can provide an operation control device and an operation control method, which can realize the intuitive and highly accurate operation of an operational object.

BRIEF DESCRIPTION OF THE DRAWINGS

FIG. 5 is an explanatory view explaining an operation of moving a cursor movable region;

FIG. 6 is an explanatory view explaining an operation of moving a cursor;

DETAILED DESCRIPTION OF THE EMBODIMENT

Figure 1:
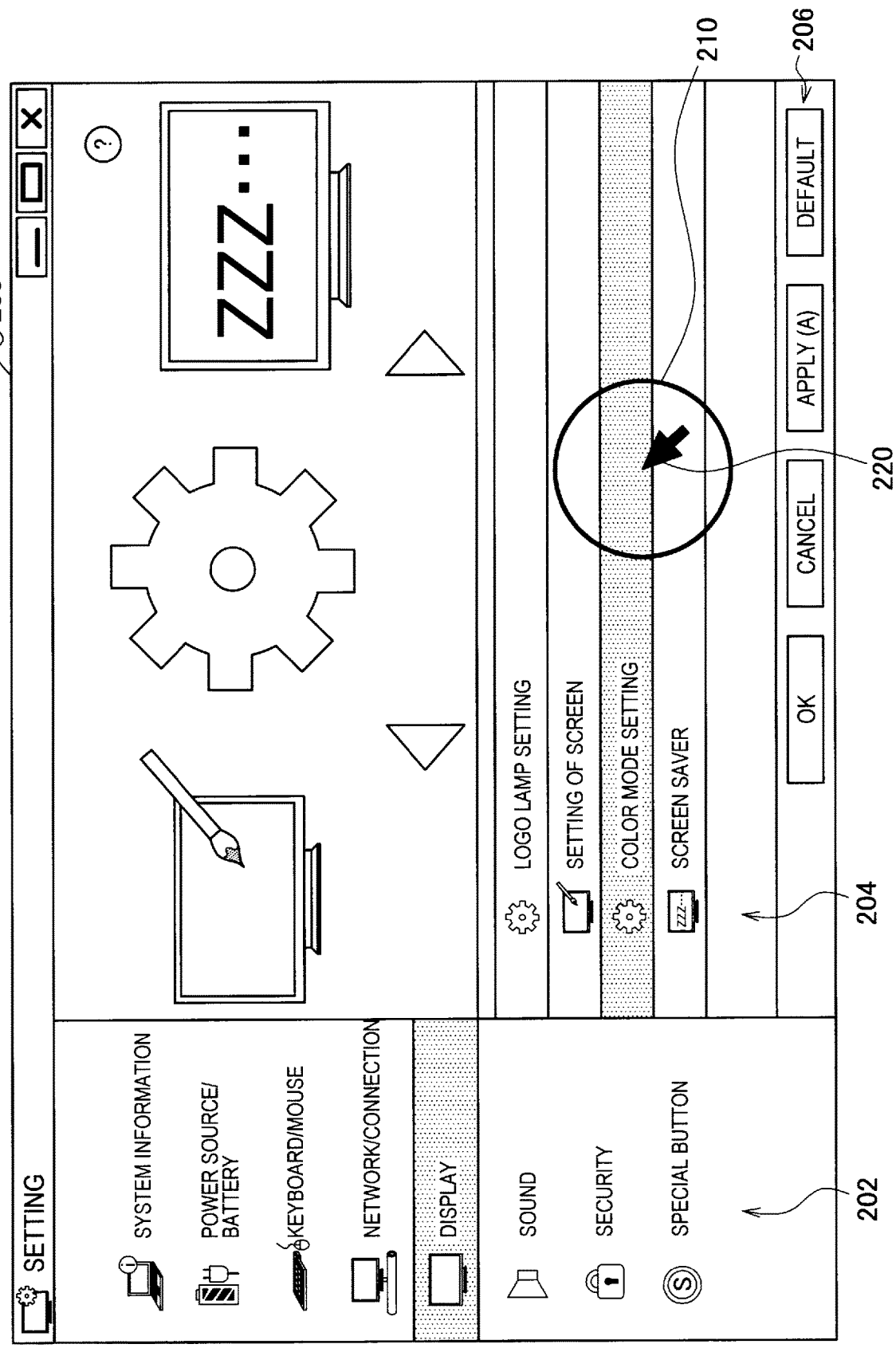
FIG. 1 is an explanatory view showing an example of a constitution of a screen operated by a user's gesture according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. Example of operating screen operated and controlled by operation control device 2. Constitution of operation control device 3. Operation control method using operation control device <1. Example of Operating Screen Operated and Controlled by Operation Control Device>

First, an example of operating a screen is described based on FIG. 1. A gesture of a user is recognized by an operation control device according to an embodiment of the present invention, and then the screen is operated and controlled. FIG. 1 is an explanatory view showing an example of a constitution of the screen operated by the user's gesture.

In the present embodiment, a target is selected by a free cursor used in a general personal computer and a mouse, and determination, cancel, and display of menus are performed. For example, as shown in FIG. 1, a setting menu of a personal computer is displayed in a display region 200 of the screen. A category view 202 showing a classification of setting information of the personal computer is displayed on the left side of the display region 200. When one category icon is selected from the category view 202, a view (a setting information view) 204 of the setting information included in the selected category is displayed. For example, when a "display" category is selected from the category view 202, the setting information view 204 including setting of a logo lamp, the screen, a color mode, and a screen saver included in the "display" category is displayed.

One setting information is selected from the setting information view 204, and then when an "OK" button is selected from operation buttons 206, the screen is changed to the setting screen of the selected setting information. Alternatively, when a "cancel" button is selected from the operation buttons 206, the selection of the setting information selected from the setting information view 204 is released.

In such a screen, the category icon, the setting information, and the operation button 206 are selected using the cursor 220. In the present embodiment, the cursor 220 is moved in response to a gesture of an operation body of a user. At that time, a cursor movable region 210 showing the movable region of the cursor 220 is set around the cursor 220. The cursor movable region 210 of the present embodiment is a circular cursor as shown in FIG. 1, for example. The cursor movable region 210 and the cursor 220 displayed in the cursor movable region 210 are moved together in the display region 200 in response to a predetermined gesture of the operation body of the user.

In the operation control device according to the present embodiment, the movement of both the cursor movable region 210 and the cursor 220 are moved together in the cursor movable region 210 and the movement of the cursor 220 in the cursor movable region 210 can be independently performed. According to this constitution, the cursor movable region 210 is pointed to an instructed object displayed in the display region 200 and instructed by the cursor 220, whereby the cursor 220 can be easily moved near the instructed object. The cursor 220 is finely moved in the cursor movable region 210, and consequently the cursor 220 can be accurately pointed to the instructed object. Hereinafter, the constitution of the operation control device, which can realize the intuitive and highly accurate operation of the cursor 220, and the operation control method using the operation control device will be described in detail.

<2. Constitution of Operation Control Device>

[Hardware Configuration]

Figure 2:
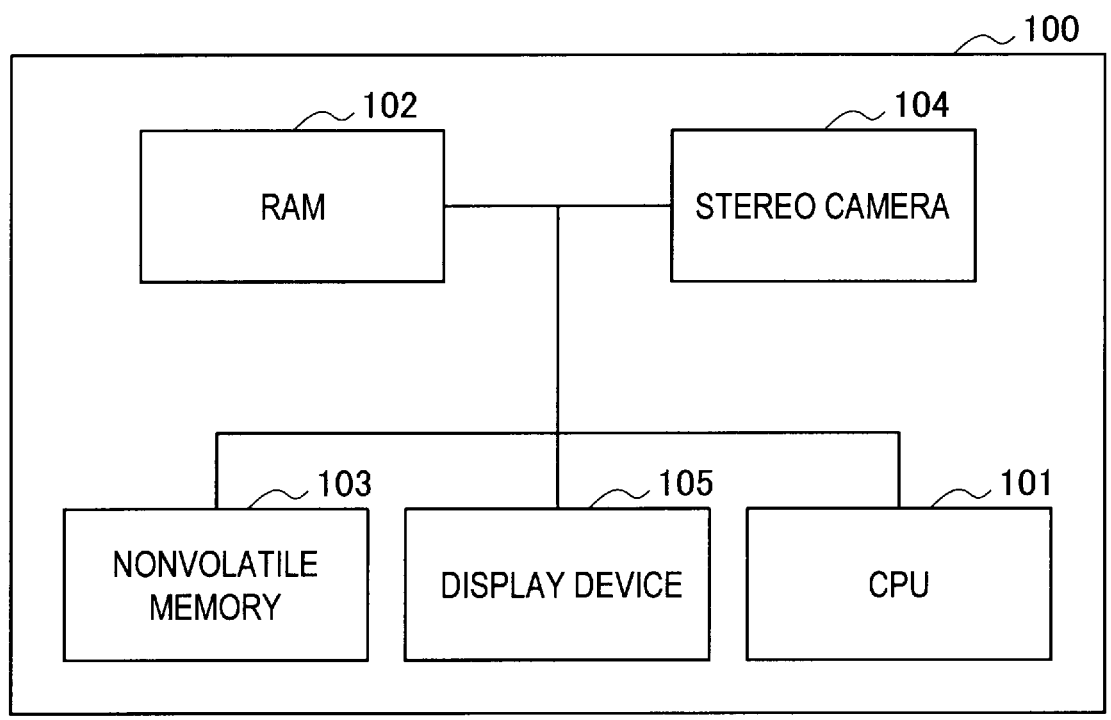
FIG. 2 is a block diagram showing a hardware configuration of an operation control device according to the embodiment.

First, a hardware configuration of an operation control device 100 according to the present embodiment will be described based on FIG. 2. FIG. 2 is a block diagram showing the hardware configuration of the operation control device 100 according to the present embodiment.

As shown in FIG. 2, the operation control device 100 according to the present embodiment is provided with a CPU (Central Processing Unit) 101, a RAM (Random Access Memory) 102, and a nonvolatile memory 103. The operation control device 100 is further provided with a stereo camera 104 and a display device 105.

The CPU 101 is operated as an arithmetic processing device and a control device and controls the entire operation in the operation control device 100 in accordance with various programs. The CPU 101 may be a microprocessor. The RAM 102 temporarily stores programs used in the execution of the CPU 101 and parameters suitably changed in the execution. They are connected to each other through a host bus constituted of a CPU bus. The nonvolatile memory 103 stores programs and arithmetic parameters used by the CPU 101. The nonvolatile memory 103 can use a ROM (Read Only Memory) and a flash memory, for example.

The stereo camera 104 is an input device which can recognize a position in a depth direction. In the stereo camera 104, two cameras simultaneously image a plurality of input portions, moved by a user, from different directions, whereby information in the depth direction of the imaged image can be recorded. Instead of the stereo camera 104, a range finder using parallax may be used, for example. The stereo camera 104 is constituted of imaging means which images a gesture performed by a user and an input control circuit which outputs the imaged image imaged by the imaging means to the CPU 101. The gesture of the user is obtained by the stereo camera 104, whereby various data can be input to the operation control device 100, or a processing operation can be instructed to the operation control device 100.

The display device 105 is an example of an output device which outputs information. As the display device 105, a CRT (Cathode Ray Tube) display device, a liquid crystal display (LCD) device, an OLED (Organic Light Emitting Diode) device can be used, for example.

[Functional Configuration]

Figure 3:
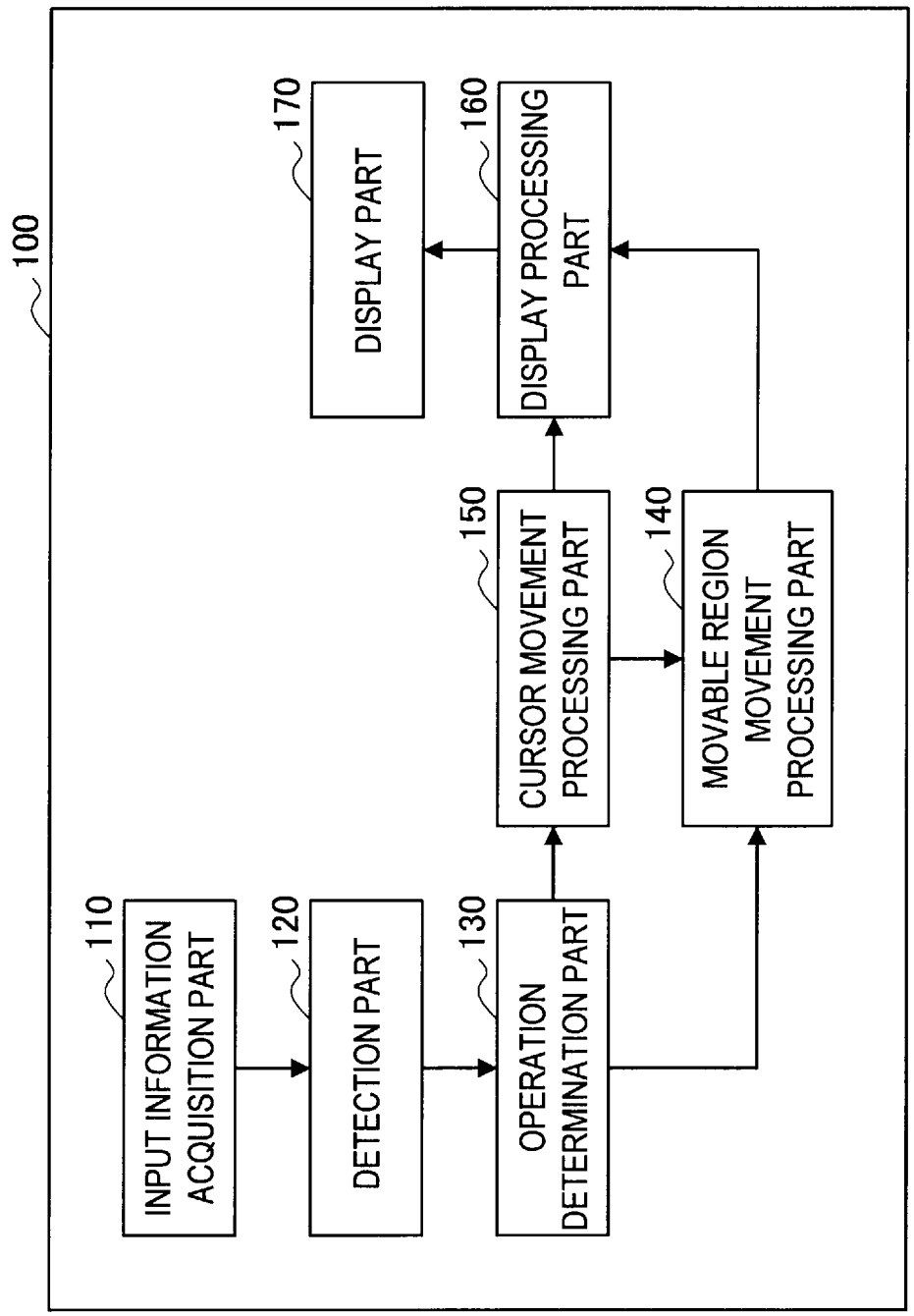
FIG. 3 is a functional block diagram showing a functional configuration of the operation control device according to the present embodiment.

Next, a functional configuration of the operation control device 100 according to the present embodiment will be described based on FIG. 3. FIG. 3 is a functional block diagram showing the functional configuration of the operation control device 100 according to the present embodiment.

As shown in FIG. 3, the operation control device 100 according to the present embodiment is provided with an input information acquisition part 110, a detection part 120, a motion determination part 130, a movable region movement processing part 140, a cursor movement processing part 150, a display processing part 160, and a display part 170.

The input information acquisition part 110 is an operation part obtaining position information of an object to be detected and corresponds to the stereo camera 104 of FIG. 2. The input information acquisition part 110 according to the present embodiment images a user, who performs operation control, to obtain the image. The image is used for determining the operation body moved by the user and obtaining the movement information of the operation body. The input information acquisition part 110 outputs the obtained image to the detection part 120.

The detection part 120 detects the operation body, moving the cursor movable region 210 or the cursor 220, from the image obtained by the input information acquisition part 110 and obtains operation body information of the operation body. The detection part 120 recognizes the operation body using the depth information of the image and an arbitrary image recognition method. The operation bodies for use in the movement of the cursor movable region 210 and the cursor 220 are respectively set in advance. For example, a first operation body operating the cursor movable region 210 can be set to the left hand of a user, and a second operation body operating the cursor 220 can be set to the right hand. The detection part 120 recognizes the operation body from an image and detects the position and shape of the operation body as the operation body information to output the operation body information to the motion determination part 130.

The depth information of the operation body can be obtained using, for example, a stereo image processing that can realize the measurement of the three-dimensional position of an object. In the detection of the operation body, an image processing method such as a shape detection, a skin color detection, and a texture matching method is used, and consequently, the operation body and the position and shape thereof can be estimated and detected from an image. The operation control device according to the present embodiment can be provided with a storage part (not shown) which stores information used in an operation control processing. The storage part corresponds to the nonvolatile memory of FIG. 2. The storage part can store the information of the first operation body operating the cursor movable region 210, the information of the second operation body operating the cursor 220, and the information of the shape in a cursor movement mode that enables the movement of the cursor by each operation body.

The motion determination part 130 determines the movement (gesture) of the detected operation body based on the operation body information received from the detection part 120. The motion determination part 130 determines whether the detected operation body operates the cursor movable region 210 or the cursor 220. The motion determination part 130 determines, based on the position and shape of the detected operation body, whether or not the operation body is in a cursor movement mode in which the cursor movable region 210 or the cursor 220 is operated.

When the motion determination part 130 determines that the first operation body operating the cursor movable region 210 is in the cursor movement mode, the motion determination part 130 makes the movable region movement processing part 140 to perform a processing for moving the cursor movable region 210 in accordance with the movement amount of the first operation body. At that time, since the cursor 220 is moved in accordance with the movement of the cursor movable region 210, the motion determination part 130 makes the cursor movement processing part 150 to move the cursor 220 in accordance with the movement amount of the first operation body.

When the motion determination part 130 determines that the second operation body operating the cursor 220 is in the cursor movement mode, the motion determination part 130 makes the cursor movement processing part 150 to perform a processing for moving the cursor 220 in accordance with the movement amount of the second operation body. When the motion determination part 130 determines that the condition of the operation body does not correspond to the above two conditions, the motion determination part 130 does not perform any output to the movable region movement processing part 140 and the cursor movement processing part 150.

The movable region movement processing part 140 performs a processing for moving the cursor movable region 210, displayed in the display region 200, in response to the movement of the operation body. Based on a current position information of the first operation body operating the cursor movable region 210, the movable region movement processing part 140 calculates the direction and amount of movement of the first operation body from the position of the first operation body in a previous time. The movable region movement processing part 140 then calculates the direction and amount of the movement of the cursor movable region 210 in the display region 200 from the direction and amount of movement of the first operation body. The movable region movement processing part 140 outputs the calculated direction and amount of the movement of the cursor movable region 210 to the display processing part 160. When the cursor 220 is located outside the cursor movable region 210 by the movement of the cursor 220, the movable region movement processing part 140 receives an instruction from the cursor movement processing part 150 to perform a processing for moving the cursor movable region 210 in accordance with the movement of the cursor 220.

The cursor movement processing part 150 performs a processing for moving the cursor 220 displayed in the display region 200 in response to the movement of the operation body. Based on the current position information, the cursor movement processing part 150 calculates the direction and amount of the movement of the first operation body, operating the cursor movable region 210, or the second operation body, operating the cursor 220, from the position of the first or second operation body in a previous time. The cursor movement processing part 150 then calculates the direction and amount of the movement of the cursor 220 from the direction and amount of the movement of the operation body. The cursor movement processing part 150 outputs the calculated direction and amount of the movement of the cursor 220 to the display processing part 160.

The cursor movement processing part 150 determines whether or not the cursor 220 is located outside the cursor movable region 210 by the movement of the cursor 220 by the second operation body. When the cursor movement processing part 150 determines that the cursor 220 is located outside the cursor movable region 210, the cursor movement processing part 150 outputs an instruction to the movable region movement processing part 140 to direct the movable region movement processing part 140 to move the cursor movable region 210.

The display processing part 160 performs a display processing for moving and displaying the cursor movable region 210 and/or the cursor 220 based on the information received from the movable region movement processing part 140 or the cursor movement processing part 150. The display processing part 160 outputs display information after the display processing to the display part 170 to make the display part 170 to display the display information. The display part 170 corresponds to the display device 105 of FIG. 2. As the display part 170, a CRT display device, a liquid crystal display device, and an OLED device can be used, for example. Although the operation control device 100 of the present embodiment is provided with the display part 170, the operation control device 100 may be used so as to connect to an external display device (not shown) without providing the display part 170.

Figure 4:
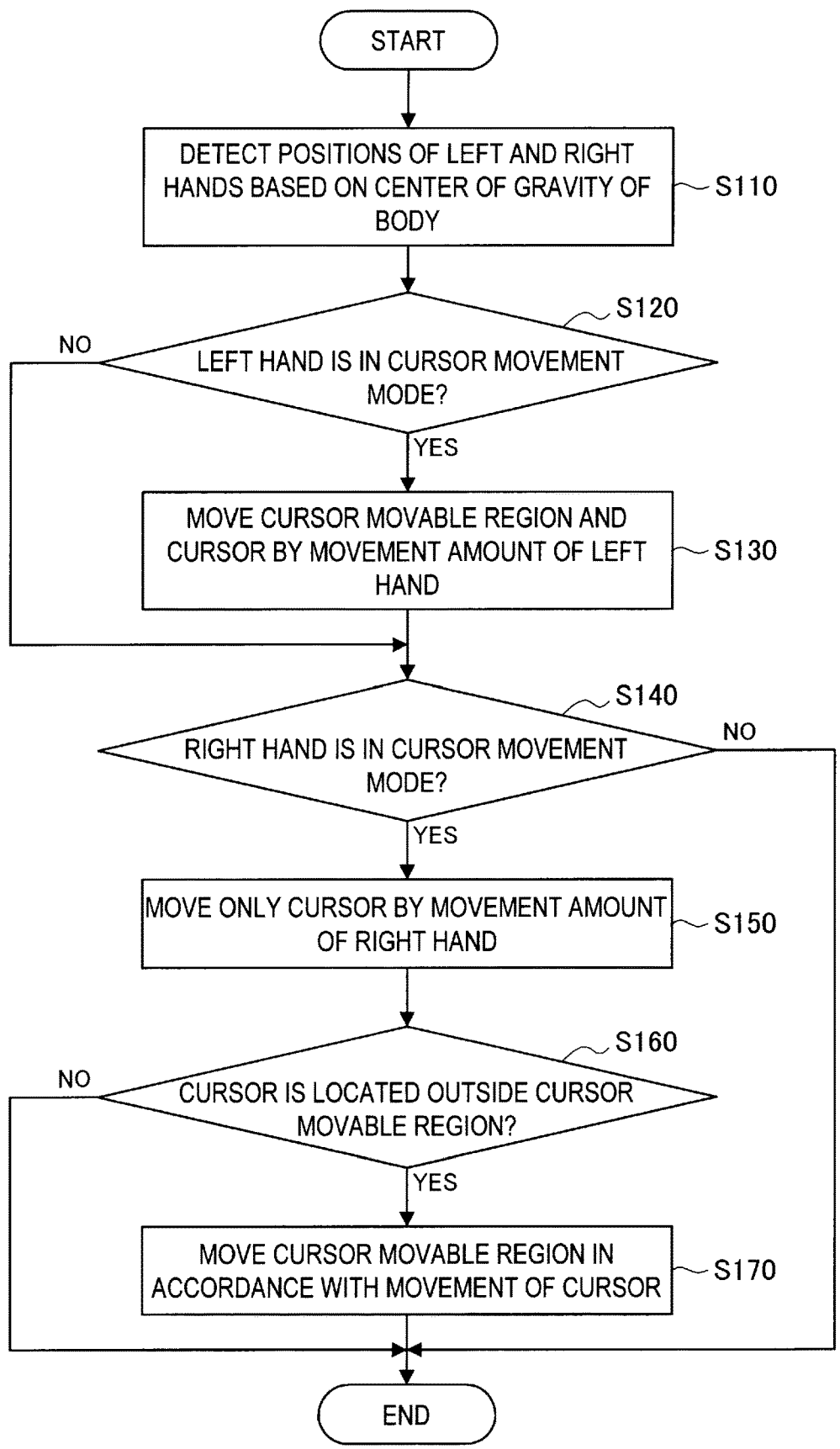
FIG. 4 is a flow chart showing an operation control method using the operation control device according to the embodiment when right and left hands are used.
Figure 7:
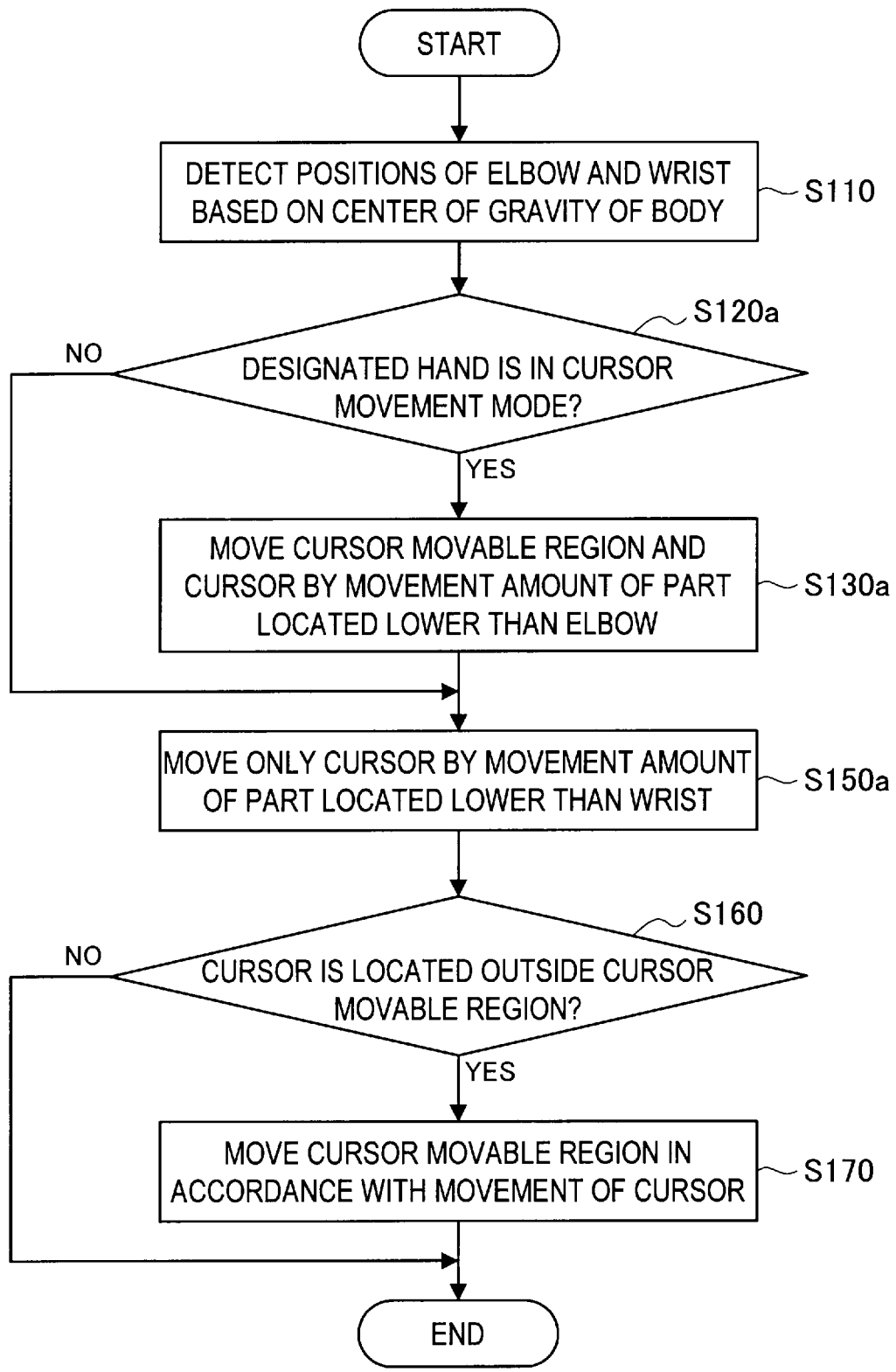
FIG. 7 is a flow chart showing the operation control method using the operation control device according to the embodiment when different joints are used.
Figure 8:
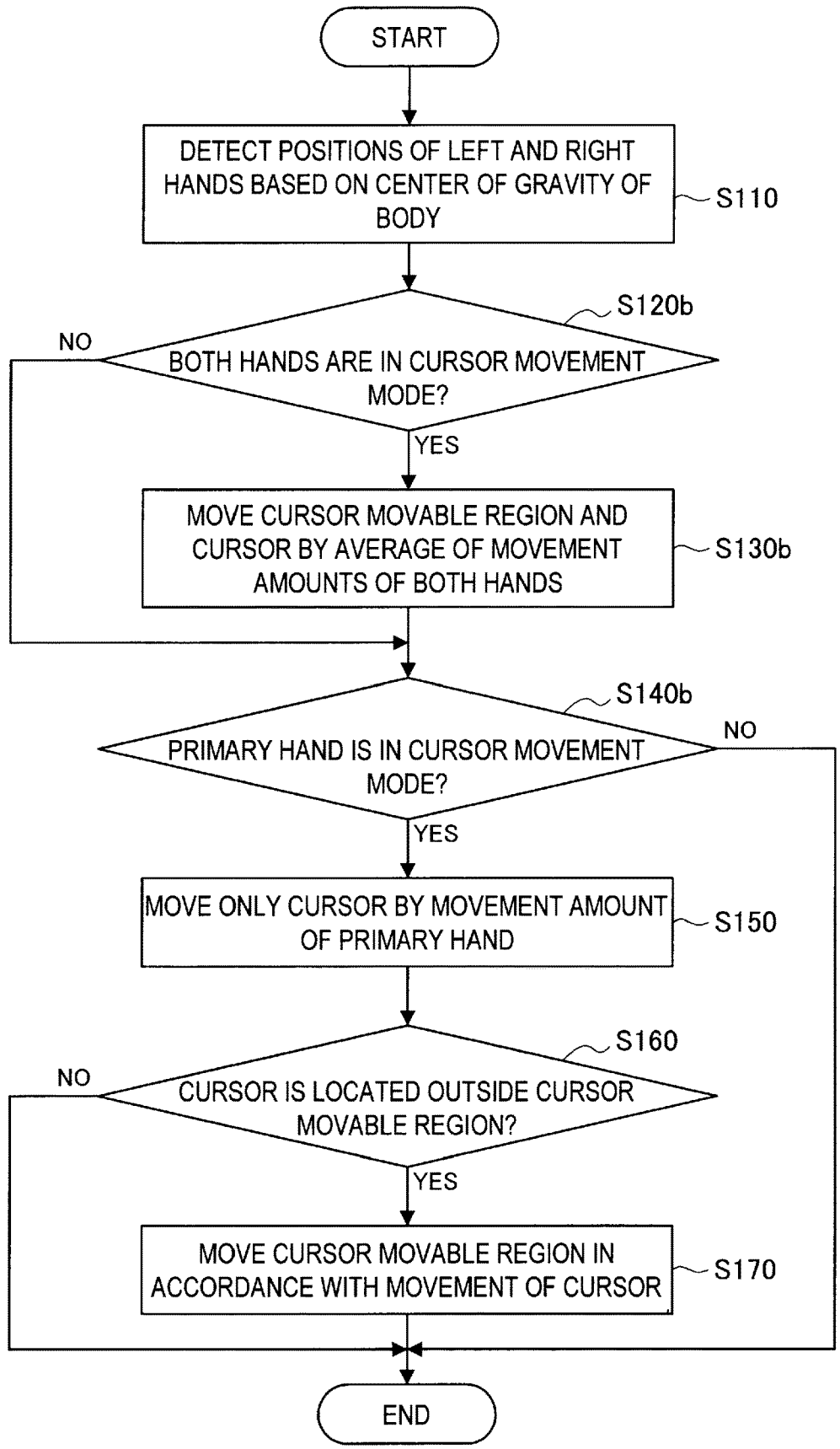
FIG. 8 is a flow chart showing the operation control method using the operation control device according to the embodiment when both hands and one hand are used.
Figure 9:
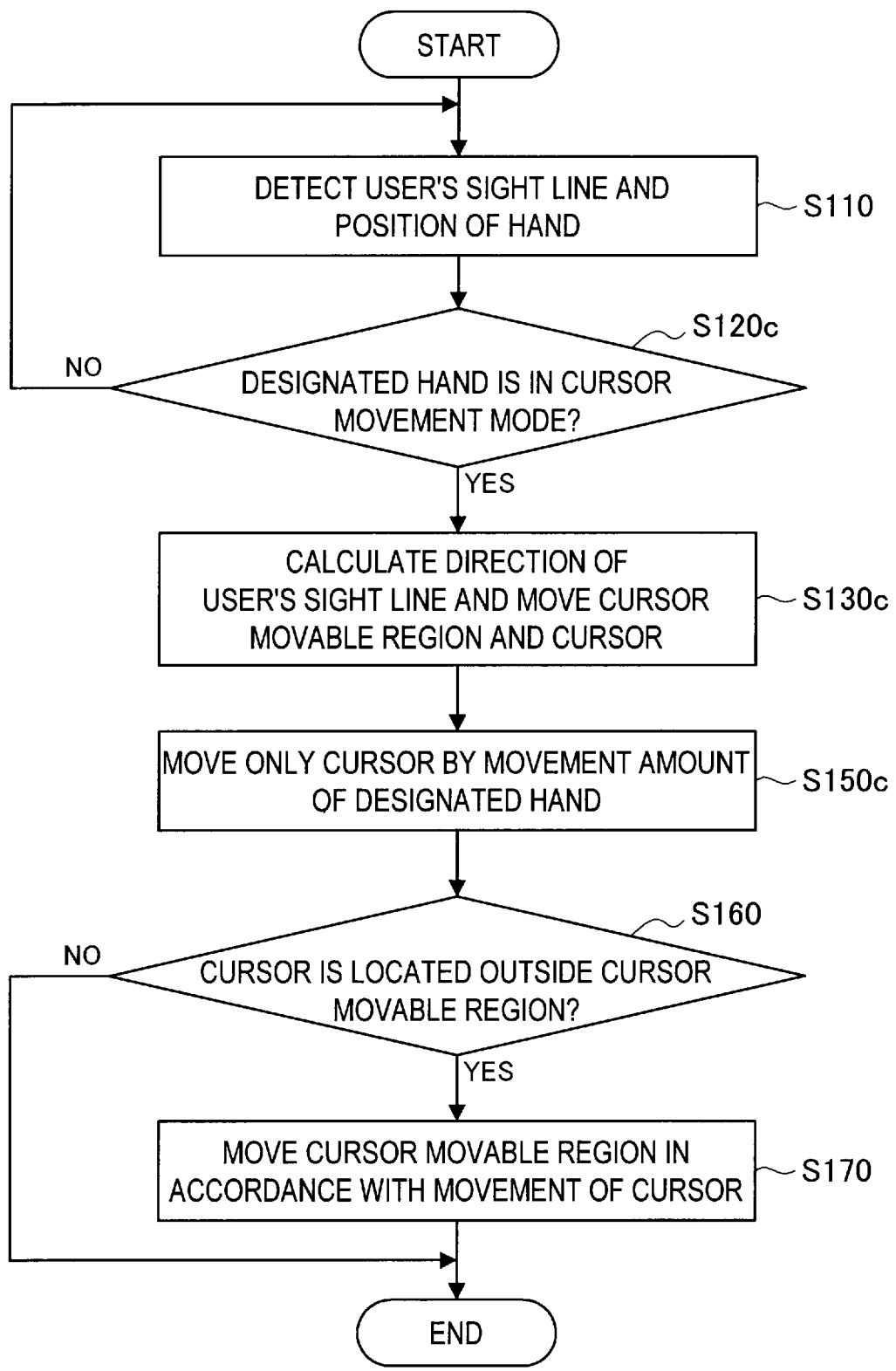
FIG. 9 is a flow chart showing the operation control method using the operation control device according to the embodiment when a user's sight line and his one hand are used.
Figure 10:
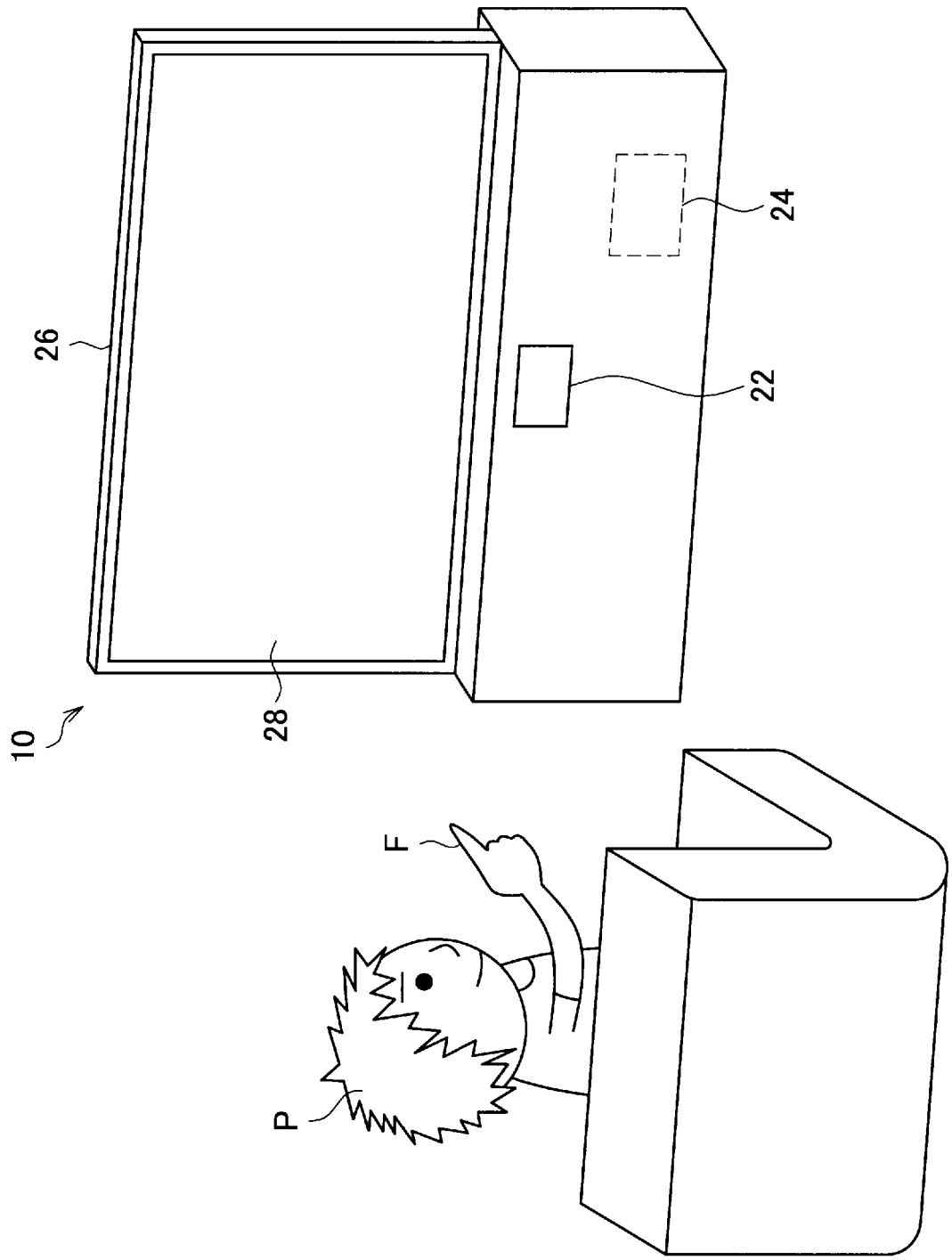
FIG. 10 is an explanatory view showing the related art input device using a gesture.

The functional configuration of the operation control device 100 according to the present embodiment has been described. By virtue of the use of the operation control device 100, the cursor movable region 210 and the cursor 220 can be independently operated, and therefore, the cursor 220 can be operated in a stepwise manner. According to this constitution, a user can operate the cursor 220 intuitively and highly accurately. Hereinafter, an operation control method using the operation control device 100 will be described based on FIGS. 4 to 9. In FIGS. 7 to 9, the same processing as the processing in the operation control method described using FIG. 4 is assigned the same reference numeral.

<3. Operation Control Method Using Operation Control Device>

In order to operate the cursor 220 in a stepwise manner, the first operation body operating the cursor movable region 210 and the second operation body operating the cursor 220 are set in the present embodiment. As those operation bodies, there can be used an operation body which is easily operated by a user and is suitable for performing a gesture that is easily associated with the operation of moving the cursor 220. As the first and second operation bodies, parts of the body or objects moved by a user such as a right hand and a left hand, different parts, both hands and one hand, and a sight line of a user and his hand can be set, for example. Hereinafter, the operation control method for the cursor 220 using the operation control device 100, when various operation bodies are used, will be described.

[(1) Operation Control Using Right and Left Hands]

First, the first operation body operating the cursor movable region 210 and the second operation body operating the cursor 220 are set respectively to a left hand and a right hand, and the operation control method for the cursor 220 using the operation control device 100 will be described based on FIGS. 4 to 6. FIG. 4 is a flow chart showing an operation control method using the operation control device according to the present embodiment when right and left hands are used. FIG. 5 is an explanatory view explaining the operation of moving the cursor movable region 210. FIG. 6 is an explanatory view explaining the operation of moving the cursor 220 in the cursor movable region 210.

First, the operation control device 100 according to the present embodiment images a user by means of the input information acquisition part 110 and detects the respective positions of the left hand operating the cursor movable region 210 and the right hand operating the cursor 220 by means of the detection part 120 (step S110). The input information acquisition part 110 of the present embodiment is the stereo camera 104, for example, and can obtain the position of the user and the depth information from an imaged image obtained by imaging the user. The detection part 120 detects the depth information and the position of the left and right hands, which are the operation bodies, from the imaged image received from the input information acquisition part 110. The detection part 120 can recognize the left and right hands by using an image processing method such as a shape detection, a skin color detection, and a texture matching method, using setting information such as a human anatomy model that is obtained by modeling the positions of regions and joints of the body previously stored in a storage part (not shown)s.

Subsequently, the motion determination part 130 determines whether or not the left hand is in the cursor movement mode (step S120). As in the present embodiment, when an operational object is operated by a gesture of a user, setting is performed so that with regard to one operation body, the motions of the operation body and the operation processing are related to each other in general. When the left hand is the operation body, the movement processing of the cursor and a volume control processing can be related to a gesture moving the left hand in left and right directions. At that time, in order to specify the processing, which will be performed, by the gesture currently being performed by the user, a mode that is information showing the processing to be performed can be set. For example, the mode can be set so that a state that the user clasps the left hand shows the cursor movement mode in which the movement processing of the cursor is performed, and a state that the user opens the left hand shows a volume control mode in which the volume control processing is performed. By virtue of the provision of the cursor movement mode, the user sets the operation body to the cursor movement mode or releases the cursor movement mode of the operation body, and thus the user can intentionally moves the cursor 220.

In step S120, whether or not the left hand operating the cursor movable region 210 is in the cursor movement mode is determined. Namely, only when the state of the left hand corresponds to the cursor movement mode in which the cursor movable region 210 is moved and operated, the cursor movable region 210 and the cursor 220 are moved by the motion of the left hand. An arbitrary gesture such as clasping a hand can be assigned to the cursor movement mode. In that case, when a user moves his clasped left hand in the up, down, left and right directions within a space, the detection part 120 determines that the left hand is clasped to thereby determine whether or not the left hand is in the cursor movement mode.

When it is determined that the left hand is not in the cursor movement mode in step S120, the motion determination part 130 executes the processing of step S140. Meanwhile, when it is determined that the left hand is in the cursor movement mode in step S120, the movable region movement processing part 140 and the cursor movement processing part 150 move the cursor movable region 210 along with the cursor 220 in accordance with the movement amount of the left hand (step S130).

The movable region movement processing part 140 performs processing of roughly moving the cursor 220. More specifically, first, as shown in FIG. 5, unit regions 230 obtained by dividing the display region 200 into a predetermined number of regions are set. In FIG. 5, one region obtained by dividing the display region 200 into m1×n1 is set as the unit region 230. The movable region movement processing part 140 moves the cursor movable region 210 and the cursor 220 in the up, down, left and right directions in the unit of the unit region 230 in accordance with the movement amount of the left hand LH. Thus, as the division number of the display region 200 becomes larger, the cursor movable region 210 and the cursor 220 are more finely moved. Meanwhile, as the division number of the display region 200 becomes smaller, the cursor movable region 210 and the cursor 220 are more roughly moved.

For example, the display region 200 is divided into 32×32, and when the left hand LH is moved by 1 cm, the cursor movable region 210 and the cursor 220 are moved in the moving direction of the left hand LH by one unit region. According to this constitution, the movable region movement processing part 140 moves the cursor movable region 210 and the cursor 220 by the movement amount corresponding to 1/32 of the display region 200 at every movement of 1 cm of the left hand LH, whereby the cursor 220 is roughly moved in the display region 200. The realization of the rough movement of the cursor has advantages of free from the influences of hand movement noise and an erroneous response to a slight movement of the left hand LH. In addition, the cursor 220 can be quickly moved near the vicinity of an operational object.

The motion determination part 130 determines whether or not the cursor movable region 210 is moved and then determines whether or not the right hand operating the cursor 220 is in the cursor movement mode (step S140). As in step S120, only when the right hand is in the cursor movement mode in which the cursor 220 is moved and operated, the cursor 220 is moved by the motion of the right hand. As in the above case, an arbitrary gesture such as clasping a hand can be assigned to the cursor movement mode of the operation body moving the cursor 220. When it is determined that the right hand is not in the cursor movement mode in step S140, the operation control device 100 does not move the cursor 220 and terminates the processing. Meanwhile, when it is determined that the right hand is in the cursor movement mode in step S140, the cursor movement processing part 150 moves the cursor 220 within the cursor movable region 210 in accordance with the movement amount of the right hand (step S150).

The cursor movement processing part 150 performs processing of moving the cursor 220 highly accurately. More specifically, first, as shown in FIG. 6, unit regions 245 obtained by dividing a predetermined region 240 including the cursor movable region 210 into a predetermined number of regions are set. In the present embodiment, although a quadrangle in which the circular cursor movable region 210 is inscribed is the region 240, the present invention is not limited to the example, and the region 240 and the cursor movable region 210 may be the same region. In FIG. 6, one region obtained by dividing the region 240 into m2×n2 is set as the unit region 245. The cursor movement processing part 150 moves the cursor 220 in the up, down, left and right directions in the unit of the unit region 245 in accordance with the movement amount of the right hand RH.

For example, the region 240 is divided into 32×32, and when the right hand RH is moved by 1 cm, the cursor 220 is moved in the moving direction of the right hand RH by only one unit region. According to this constitution, the cursor movement processing part 150 can move the cursor 220 by the movement amount corresponding to 1/32 of the region 240 at every movement of 1 cm of the right hand RH. Namely, compared with the case where the cursor movable region 210 and the cursor 220 are moved by the left hand LH, the movement amount of the cursor 220 is small when the hand is moved by the same distance, and the cursor 220 can be finely moved in the display region 200. As the unit region 245 is reduced in size (for example, the unit region 245 is constituted of one pixel), the cursor 220 can be more finely moved by the right hand RH.

When the cursor 220 is moved in response to the movement of the right hand RH, the cursor movement processing part 150 determines whether or not the cursor 220 is located outside the cursor movable region 210 (step S160). The cursor movement processing part 150 calculates the direction and amount of movement of the cursor 220 from the direction and amount of movement of the right hand RH to grasp the positional relation between the moved cursor 220 and the cursor movable region 210 in the display region 220. The positional relation can be calculated from, for example, coordinates of the moved cursor 220 in the display region 220 and a function showing the cursor movable region 210.

When it is determined that the moved cursor 220 is located in the cursor movable region 210 in step S160, only the cursor 220 is moved in response to the movement of the right hand RH, and thereafter, the operation control device 100 terminates the processing. Meanwhile, it is determined that the moved cursor 220 is located outside the cursor movable region 210 in step S160, the cursor movement processing part 150 instructs the movable region movement processing part 140 to move the cursor movable region 210 in response to the movement of the right hand RH. According to this constitution, the cursor movable region 210 is moved along with the cursor 220 (step S170). This processing can prevent the cursor 220 from being located outside the cursor movable region 210.

There has been described the operation control method using the operation control device 100 according to the present embodiment when the right and left hands are used. In this operation control method, the cursor movable region 210 and the cursor 220 are roughly moved by the left hand, and the cursor 220 is finely moved by the right hand. Since the cursor 220 can be moved in a stepwise manner, the cursor 220 can be intuitively and highly accurately operated.

[(2) Operation Control Using Different Parts]

Next, an example in which the cursor 220 is moved in a stepwise manner by different joints will be described based on FIG. 7. FIG. 7 is a flow chart showing the operation control method using the operation control device 100 according to the present embodiment when different parts are used. In this example, the part from the elbow joint to the wrist is the first operation body operating the cursor movable region 210, and the part from the wrist joint to the ends of the fingers is the second operation body operating the cursor 220. Namely, for example when the wrist is moved with the elbow joint as the fulcrum, the cursor movable region 210 and the cursor 220 are moved in response to the movement of the wrist. When the palm or the lower parts such as fingers is moved with the wrist joint as the fulcrum, only the cursor 220 is moved in response to the movement of the palm or the fingers.

In the above operation control method, first, the positions of the joints of the body of the user are estimated from an image obtained by the input information acquisition part 110, and the positions of the elbow joint and the wrist joint are detected by the detection part 120 (step S110). In the detection of each joint, for example, as described above, the human anatomy model stored in a storage part (not shown) is used, and the joint positions are estimated from the positional relation between the respective parts of the body, whereby the joint positions can be detected.

Subsequently, it is determined whether or not the hand moving and operating the cursor movable region 210 and the cursor 220 is in the cursor movement mode (step S120a). For example, when the right hand operates the cursor movable region 210 and the cursor 220, the cursor movable region 210 and the cursor 220 are moved only when the right hand is in the cursor movement mode. For example, a state that the hand is raised higher than a predetermined height (for example, the height of the waist) can be set as the cursor movement mode. According to this constitution, when the user raises the other hand which is not the operation body operating the cursor movable region 210 and the cursor 220, it is possible to prevent the cursor movable region 210 and the cursor 220 from being moved by mistake.

When it is determined that the right hand is not raised in step S120a, the processing of step S150a is performed. Meanwhile, when it is determined that the right hand is raised in step S120a, the movable region movement processing part 140 and the cursor movement processing part 150 move the cursor movable region 210 and the cursor 220 in accordance with the movement amount of the part located lower than the elbow joint (step S130a). The part located lower than the elbow joint includes the parts on the wrist side. For example, the arm includes the shoulder, the elbow, the wrist, the bases of the fingers, and the joints and parts of the fingers. With regard to arbitrary parts of those parts, the parts located on the shoulder side are upper parts, and the parts located on the finger side are lower parts.

In step S130a, the movable region movement processing part 140 moves the cursor movable region 210 and the cursor 220 together by the movement amount of the lower part, located lower than the elbow joint, in the moving direction of the lower part. The direction and amount of movement of the cursor movable region 210 and the cursor 220 in step S130a can be determined in a similar manner to step S130 of FIG. 4. Namely, the cursor movable region 210 and the cursor 220 are roughly moved in the display region 200.

After that, the cursor movement processing part 150 moves only the cursor 220 in accordance with the movement amount of the part located lower than the wrist (step S150a). Based on the detection result obtained by the detection part 120, the cursor movement processing part 150 moves the cursor 220 by the movement amount of the lower part, located lower than the wrist, such as fingers, in the moving direction of the lower part. The direction and amount of movement of the cursor 220 in step S150a can be determined in a similar manner to step S150 of FIG. 4. Namely, the cursor 220 can be finely moved in the cursor movable region 210.

When the cursor 220 is moved in response to the movement of the lower part located lower than the wrist, the cursor movement processing part 150 determines whether or not the cursor 220 is located outside the cursor movable region 210 (step S160). When it is determined that the cursor 220 is located outside the cursor movable region 210 in step S160, the movable region movement processing part 140 moves the cursor movable region 210 along with the cursor 220 in response to the movement of the lower part (step S170). Meanwhile, when it is determined that the cursor 220 is not located outside the cursor movable region 210 in step S160, only the cursor 220 is moved in response to the movement of the lower part located lower than the wrist, and thereafter the operation control device 100 terminates the processing.

There has been described the operation control method using the operation control device 100 according to the present embodiment when the different parts are used. According to this operation control method, the cursor 220 can be moved in a stepwise manner by moving the different parts. Further, the operation control method of this example has advantage that the cursor 220 can be roughly or finely moved by the same hand.

[(3) Operation Control Using Both Hands and One Hand]

Next, an example in which the cursor 220 is moved in a stepwise manner by both hands and one hand will be described based on FIG. 8. FIG. 8 is a flow chart showing the operation control method using the operation control device 100 according to the present embodiment when both hands and one hand are used. In this example, the both hands are used as the first operation body operating the cursor movable region 210, and either left or right hand is used as the second operation body operating the cursor 220. Namely, when the both hands are moved in the cursor movement mode, the cursor movable region 210 and the cursor 220 can be moved. When only one hand which is set as the second operation body is moved, only the cursor 220 can be moved. Hereinafter, the hand as the second operation body is a primary hand.

In the operation control method, first, the detection part 120 estimates the positions of the parts of the body of the user from the image, obtained by the input information acquisition part 110, and detects the positions of the both hands (step S110). Subsequently, it is determined whether or not the both hands detected in step S110 are in the cursor movement mode (step S120b). As the cursor movement mode, a state that the right hand is clasped and the left hand is open can be set, for example. The state of the hand can be recognized by using the image processing method such as a shape detection, using setting information such as the human anatomy model previously stored in a storage part (not shown).

The motion determination part 130 determines whether or not the both hands are in the cursor movement mode from the detected hand state. When at least one hand is not in the cursor movement mode, the processing of step S140b is performed. Meanwhile, when it is determined that the both hands are in the cursor movement mode in step S120b, the movable region movement processing part 140 and the cursor movement processing part 150 move the cursor movable region 210 and the cursor 220 by the movement amount of the both hands in the moving direction of the both hands (step S130b). The direction and amount of movement of the both hands may be the average of the directions and amounts of movement of the respective hands or may be the direction and amount of movement of either one hand. The direction and amount of movement of the cursor movable region 210 and the cursor 220 in step S130b can be determined in a similar way to step S130 of FIG. 4. Namely, the cursor movable region 210 and the cursor 220 are roughly moved in the display region 200.

Subsequently, the cursor movement processing part 150 determines whether or not the primary hand is in the cursor movement mode (step S140b). At that time, in the same manner as step S120b, the cursor movement mode of the right hand as the primary hand may be a state that the hand is clasped, for example. In this example, in the case where the cursor movable region 210 and the cursor 220 are moved by both hands and the case where only the cursor 220 is moved by the primary hand, it is preferable that the cursor movement mode is set so that the both cases can be clearly distinguished. In this example, the cursor movement modes of the right hand as the primary hand are the same, and the case where the cursor movable region 210 and the cursor 220 are moved and the case where only the cursor 220 is moved are distinguished from the state of the left hand which is not the primary hand.

When it is determined that the primary hand is not in the cursor movement mode in step S140b, the movable region movement processing part 140 terminates the processing. Meanwhile, when it is determined that the primary hand is in the cursor movement mode in step S140b, only the cursor 220 is moved in accordance with the movement amount of the primary hand (step S150). Based on the detection result obtained by the detection part 120, the cursor movement processing part 150 moves the cursor 220 by the movement amount of the right hand in the moving direction of the right hand. The direction and amount of movement of the cursor 220 in step S150 can be determined in a similar manner to step S150 of FIG. 4. Namely, the cursor 220 can be finely moved in the cursor movable region 210.

When the cursor 220 is moved in response to the movement of the right hand which is the primary hand, the cursor movement processing part 150 determines whether or not the cursor 220 is located outside the cursor movable region 210 (step S160). When it is determined that the cursor 220 is located outside the cursor movable region 210 in step S160, the movable region movement processing part 140 moves the cursor movable region 210 along with the cursor 220 in response to the movement of the right hand (step S170). Meanwhile, when it is determined that the cursor 220 is not located outside the cursor movable region 210 in step S160, only the cursor 220 is moved in response to the movement of the right hand, and thereafter the operation control device 100 terminates the processing.

There has been described the operation control method using the operation control device 100 according to the present embodiment when both hands and one hand are used. According to this operation control method, the cursor 220 can be moved in a stepwise manner by moving either both hands or only one hand.

[(4) Operation Control Using User's Sight Line and his Hand]

Next, an example in which the cursor 220 is moved in a stepwise manner by a sight line of a user and his hand will be described based on FIG. 9. FIG. 9 is a flow chart showing the operation control method using the operation control device 100 according to the present embodiment when the user's sight line and his hand are used. In this example, the cursor movable region 210 is operated by the user's sight line which is the first operation body, and the cursor 220 is operated by the user's hand which is the second operation body. According to the operation control method in this example, the sight line is directed in an approximate direction in which the user wants to move the cursor 220, whereby the cursor movable region 210 and the cursor 220 can be quickly moved, and the cursor 220 moved near an operational object can be operated manually with high accuracy.

In the above operation control method, first, the detection part 120 estimates the positions of the joints of the body of the user from the image, obtained by the input information acquisition part 110, and detects the user's sight line and the position of the hand operating the cursor 220 (step S110). As described above, the position of the hand can be detected by using the image processing method such as a shape detection, using setting information such as the human anatomy model previously stored in a storage part (not shown). The direction of the user's sight line can be detected using the method described in Japanese Patent Application Laid-Open No. 8-308801, for example. Namely, two light fluxes are projected onto the eyeballs of the user at different incident angles, and the reflected lights of the projected light fluxes reflected from the eyeballs are received. Two image signals corresponding to the reflected lights are generated, and a value corresponding to the position of the pupil of the eyeball is calculated based on the difference information of the image signals. The direction of the user's sight line can be detected based on the position of the pupil and a position of a Purkinje image of the eyeball detected from the reflected light from the eyeball.

Subsequently, it is determined whether or not the hand which is the operation body and is detected in step S110 is in the cursor movement mode (step S120c). In step S120c, when it is determined whether or not the cursor movable region 210 and the cursor 220 are moved in the direction of the user's sight line, the cursor movement mode of the operation body operating the cursor 220 is used. When the operation body operating the cursor 220 is the right hand, a state that only the right hand is raised to not less than a predetermined height (for example, the height of the waist) can be set as the cursor movement mode. In step S120c, the hand moving the cursor 220 is limited to one hand (the right hand in this example), whereby a false detection occurring when the both hands are raised can be prevented.

When it is determined that the hand as the operation body is not in the cursor movement mode in step S120c, the processing returns to step S110, and the processing from step S110 is repeated. Meanwhile, when it is determined that the hand as the operation body is in the cursor movement mode in step S120c, the movable region movement processing part 140 and the cursor movement processing part 150 calculate the direction of the user's sight line to move the cursor movable region 210 and the cursor 220 (step S130c).

At that time, for example, the cursor movable region 210 may be moved so that the center of the cursor movable region 210 is located in the unit region 230 of the display region 200 including the intersection between the direction of the user's sight line and the display region 200. The cursor 220 may be moved in synchronism with the movement of the cursor movable region 210 by the cursor movement processing part 150. The cursor movable region 210 and the cursor 220 are moved in this manner, whereby the cursor movable region 210 and the cursor 220 can be roughly moved in the display region 200.

Subsequently, when the hand as the operation body is moved in the cursor movement mode, the cursor movement processing part 150 moves only the cursor 220 by the movement amount of the hand in the moving direction of the hand (step S150c). The direction and amount of movement of the cursor 220 in step S150c can be determined in a similar manner to step S150 of FIG. 4. According to this constitution, the cursor 220 can be moved finely in the cursor movable region 210.

When the cursor 220 is moved in response to the movement of the hand which is the operation body (the right hand), the cursor movement processing part 150 determines whether or not the cursor 220 is located outside the cursor movable region 210 (step S160). When it is determined that the cursor 220 is located outside the cursor movable region 210 in step S160, the movable region movement processing part 140 moves the cursor movable region 210 along with the cursor 220 in response to the movement of the right hand (step S170). Meanwhile, when it is determined that the cursor 220 is not located outside the cursor movable region 210 in step S160, only the cursor 220 is moved in response to the movement of the right hand, and thereafter the operation control device 100 terminates the processing.

The operation control method using the user's sight line and his hand has been described. According to this operation control method, the cursor 220 can be moved in a stepwise manner by moving the user's sight line and his hand.

There has been described the operation control device 100 according to the present embodiment and the operation control method using the operation control device 100. According to the present embodiment, the cursor 220 can be roughly moved along with the cursor movable region 210, and, in addition, only the cursor 220 can be finely moved. The cursor 220 can be operated in a stepwise manner by a gesture, and the cursor 220 can be operated intuitively and highly accurately.

It should be understood by those skilled in the art that various modifications, combinations, sub-combinations and alterations may occur depending on design requirements and other factors insofar as they are within the scope of the appended claims or the equivalents thereof.

For example, in the present embodiment, although the cursor movable region 210 is a circular cursor, the present invention is not limited to this example. For example, the cursor movable region 210 may be a cursor having a polygonal shape such as a quadrangle.

In the present embodiment, although the size of the cursor movable region 210 is fixed, the present invention is not limited to this example. For example, the size of the cursor movable region 210 may be varied, whereby the cursor movable region 210, having a proper size corresponding to the layout of a screen displayed in the display region 200 in which the cursor 200 is moved, can be set by a user.

For example, when the size of an object instructed by the cursor 220 is slightly larger than the cursor movable region 210, the cursor 220 can be easily moved near the object. Thereafter, a user moves the second operation body to fine adjust the position of the cursor 220 in the cursor movable region 210, and, thus, to move the cursor 220, whereby the object can be accurately selected.

The size of the cursor movable region 210 can be changed by a gesture of a user. For example, when the user faces his palms to separate the both hands, the size of the cursor movable region 210 can be increased, and when the user faces his palms to put the both hands close together, the size of the cursor movable region 210 can be reduced. At that time, a size change mode that enables the change of the size of the cursor movable region 210 is set, and the size of the cursor movable region 210 may be changed only when a user intends to change the size.

What is claimed is:

1. An operation control device comprising:
  circuitry configured to:
    detect a motion of a user to be detected;
    control to move a focus movable region on a screen based on detection of a first detected motion of the user, wherein the focus movable region shows a movable region of a selectable operation on the screen and is moved to move a selectable region a selectable movement amount, in which the selectable movement amount is based on the movement of the focus movable region;
    when movement of a second detected motion of the user is detected, control to select an object displayed in the moved focus movable region in accordance with the movement of the second detected motion of the user; and
    when the selectable operation is located outside the focus movable region based on the second detected motion of the user, control to move the movement of the focus movable region so that the selectable operation is performed within the focus movable region.

2. The operation control device according to claim 1, wherein the selectable region is moved while the moved focus movable region is stationary.

3. The operation control device according to claim 1, wherein the circuitry is configured to, when a region formed by dividing the moved focus movable region into a predetermined number of regions is a first unit region, control performing the selectable operation in one of the first unit regions in accordance with an amount of movement of the second detected motion of the user.

4. The operation control device according to claim 1, wherein the first detected motion of the user is motion of a first hand of the user and the second detected motion of the user is motion of a second hand of the user.

5. The operation control device according to claim 1, wherein the first detected motion of the user is motion of an eye of eyes of the user and the second detected motion of the user is motion of one of hands of the user.

6. The operation control device according to claim 5, wherein the detection of the first detection motion of the user detects sight line of the user.

7. The operation control device according to claim 6, wherein the sight light is in accordance with direction of the eyes of the user.

8. The operation control device according to claim 1, wherein the selectable operation is performed within the focus movable region by a cursor or pointer.

9. The operation control device according to claim 1, wherein the circuitry is connected to an imaging device and a display device, and
wherein the circuitry is configured to:
obtain the motion of the user to be detected by the imaging device, and
control the movement of the selectable region and the focus movable region by displaying the selectable region and the focus movable region in an image created by the display device.

10. The operation control device according to claim 1, wherein the circuitry is configured to control displaying an indication that the selectable operation is performed within the focus movable region.

11. An operation control method comprising:
detecting a motion of a user to be detected;
controlling movement of a focus movable region on a screen based on detection of a first detected motion of the user, wherein the focus movable region shows a movable region of a selectable operation on the screen and is moved to move a selectable region a selectable movement amount, in which the selectable movement amount is based on the movement of the focus movable region;
when movement of a second detected motion of the user is detected, controlling to select an object displayed in the moved focus movable region in accordance with the movement of the second detected motion of the user; and
when the selectable operation is located outside the focus movable region based on the second detected motion of the user, controlling to move the movement of the focus movable region so that the selectable operation is performed within the focus movable region.

12. A non-transitory recording medium configured to store a program executable by a computer, the program comprising:
detecting a motion of a user to be detected;
controlling movement of a focus movable region on a screen based on detection of a first detected motion of the user, wherein the focus movable region shows a movable region of a selectable operation on the screen and is moved to move a selectable region a selectable movement amount, in which the selectable movement amount is based on the movement of the focus movable region;
when movement of a second detected motion of the user is detected, controlling to select an object displayed in the moved focus movable region in accordance with the movement of the second detected motion of the user; and
when the selectable operation is located outside the focus movable region based on the second detected motion of the user, controlling to move the movement of the focus movable region so that the selectable operation is performed within the focus movable region.

* * * * *